June 8, 1937.  H. J. LOUNSBURY  2,082,964
HAND BRAKE
Filed May 20, 1935
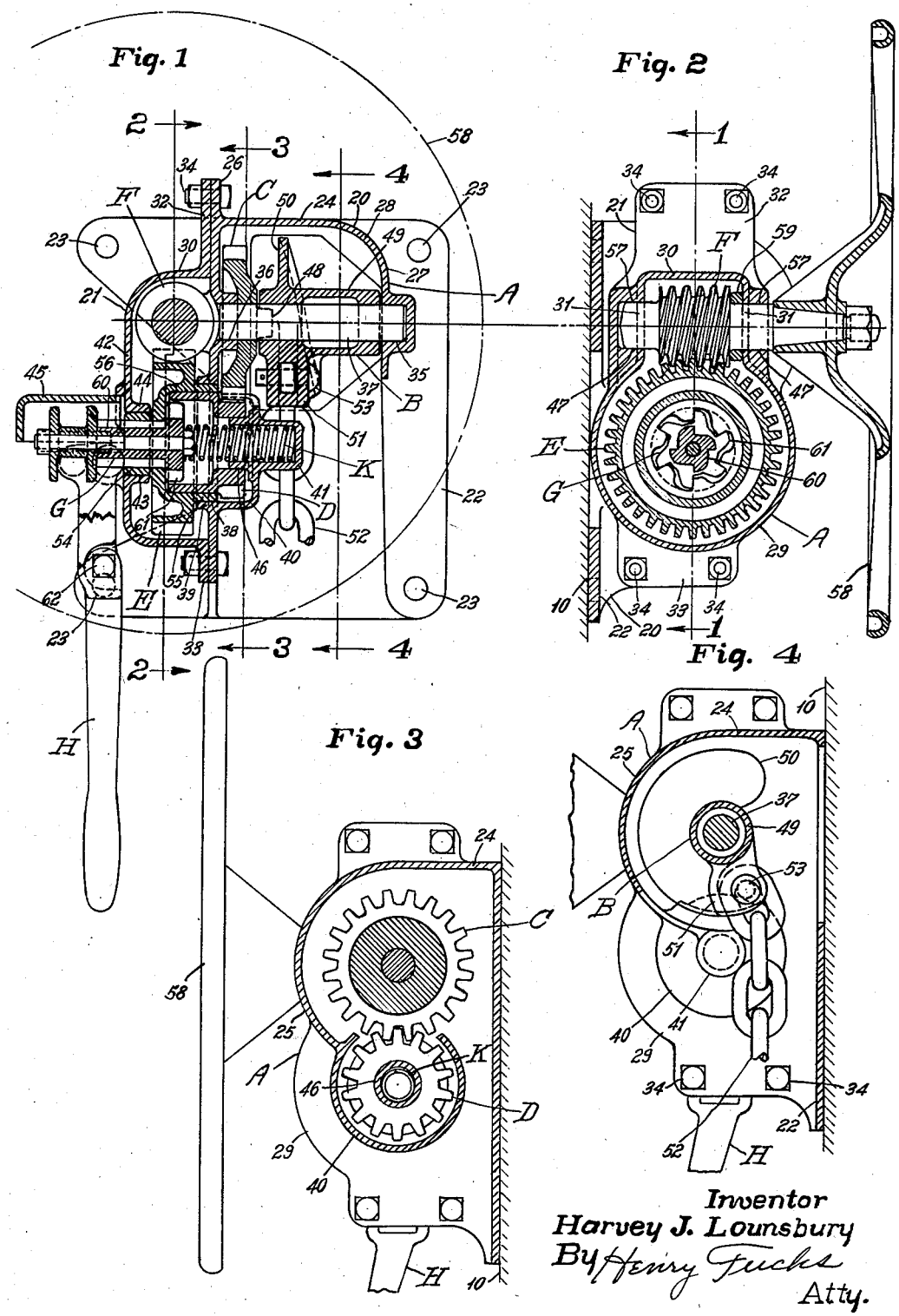
Inventor
Harvey J. Lounsbury
By Henry Fuchs
Atty.

Patented June 8, 1937

2,082,964

UNITED STATES PATENT OFFICE 2,082,964

HAND BRAKE

Harvey J. Lounsbury, Glen Ellyn, Ill., assignor to W. H. Miner, Inc., Chicago, Ill., a corporation of Delaware Application May 20, 1935, Serial No. 22,315

5 Claims. (Cl. 74—505)

This invention relates to improvements in hand brakes especially designed for use in connection with railway cars.

One object of the invention is to provide an efficient hand brake mechanism of the worm gear driven type, wherein quick and complete release of the brakes is effected by disconnecting the chain winding mechanism from the driving means, thereby avoiding the necessity of rotating the hand wheel to effect such quick releasing action.

A more specific object of the invention is to provide a mechanism of the character described, enclosed in a housing which is attached to the end wall of the car, wherein the housing and parts contained therein are so arranged that the mechanism may be easily and economically assembled and the mechanism as assembled comes well within the clearance limits prescribed in standard railway practice.

A further object of the invention is to provide a power hand brake mechanism wherein the rotary chain winding drum is actuated by power multiplying gearing comprising cooperating spur gears for rotating the drum wherein the spur gears are driven by cooperating worm and worm wheel members adapted to be operatively connected to, and disconnected from, the spur gears by means of a manually actuated clutch mechanism between the worm wheel and one of the spur gears.

Another object of the invention is to provide in a worm gear driven brake mechanism including clutch means for operatively connecting the driving means to the chain winding means of the brakes, wherein means is employed to arrest rotation of the drum in a predetermined position when the brakes are completely released and prevent rewinding of the chain on the drum, which might otherwise occur, by over-rotation of the drum in chain unwinding direction.

Other objects of the invention will more clearly appear from the description and claims hereinafter following.

In the drawing forming a part of this specification, Figure 1 is a vertical sectional view of the improved hand brake mechanism, shown in the position it occupies when mounted on the end wall of a railway car, the section being in a plane parallel to said end wall, and the operating hand wheel of said mechanism being shown in dotted lines in said figure. Figure 2 is a vertical sectional view, corresponding substantially to the line 2—2 of Figure 1. Figure 3 is a vertical sectional view, corresponding substantially to the line 3—3 of Figure 1, the operating hand wheel being shown in elevation. Figure 4 is a vertical sectional view, corresponding substantially to the line 4—4 of Figure 1, the operating hand wheel being partly broken away in said view.

In said drawing 10 indicates the end wall of a railway car on which the improved hand brake mechanism is mounted.

My improved power hand brake mechanism comprises broadly, a housing A containing the operating parts of the mechanism; a chain winding drum B; a spur gear C operatively connected to the drum; a spur gear D meshing with the spur gear C; a worm wheel E; a worm F actuated by the usual hand wheel of the brake mechanism and meshing with the worm wheel E; a clutch member G operatively connecting the worm wheel E and the spur gear D; a clutch operating lever H; and a clutch spring K.

The housing A comprises two sections, which are preferably bolted together, as shown in Figure 1, one of said sections being indicated by 20 and the other by 21. The section 20 of the housing comprises a back plate 22 having openings 23—23—23—23 adapted to accommodate securing elements, such as bolts or rivets, for fastening the housing to the end wall of the car. The housing section 20 further includes a top wall member 24 formed integral with the plate 22 and projecting forwardly therefrom, a curved front wall 25, forming a continuation of the top wall 24, and vertical side walls 26 and 27 projecting forwardly from the plate 22. The side wall 27, which is shorter than the wall 26, is connected to the top wall 24 by curved sections 28. The section 21 of the housing A is in the form of a cap bolted to the section 20 and comprises a cylindrical wall portion 29 at the bottom thereof, a horizontal top wall 30, and relatively vertical wall sections 31—31 connecting the top wall and the curved wall 29. The cap section 21 also has top and bottom flanges 32 and 33, which bear on the outer side of the wall 26 of the housing section 20. The housing sections 20 and 21 are secured together by a plurality of bolts 34—34 and 34—34, which extend through the flanges 32 and 33 of the section 21 and the wall 26 of the section 20. As shown in Figure 1, the wall section 26 extends above the top wall 24 of the housing section 20 to accommodate the corresponding bolts 34—34. The wall sections 26 and 27 are provided with aligned seats 35 and 36 within which the opposite ends of a supporting shaft 37 are secured. Below the seat 36, the wall 26 is provided with a circular bearing opening 38 which is reenforced by an outwardly extending annular flange 39. Coaxial with the opening 38 the wall 26 is provided with a hollow caplike section 40 which projects from the wall on the side opposite to the flange 39. The cap section 40 is provided with a projecting hollow boss portion 41, which is also coaxial with the opening 38. The cap 40 and the hollow boss 41 are formed integral with the wall 26, and said boss 41 forms a stop member for limiting rotation of the drum in unwinding direction, as hereinafter more fully pointed out. The vertical outer wall of the section 21, which is indicated by 42, is provided with a bearing opening 43 coaxial with the bearing opening 38 of the wall 26 of the section 20 of the housing, and said opening 43 is reenforced by an interior, annular flange 44. Attached to the housing section 21, adjacent to the opening 43, is a cover plate 45, which overhangs the outer end of the clutch member of the mechanism. A sleevelike bearing section 46 is formed integral with the caplike portion 40 and serves as a bearing support for one of the spur gears, as hereinafter pointed out. The vertical wall portions 31—31 of the section 21 of the housing are thickened, as shown in Figure 2, said thickened portions being provided with aligned bearing openings 47—47 forming journal bearings for the worm member of the brake mechanism.

The chain winding drum B is in the form of a casting and is rotatably mounted on the fixed shaft 37. The spur gear C is also rotatably mounted on the shaft 37 and is fixed to the drum in any suitable manner. In the construction illustrated, the spur gear C is provided with locking projections 48, which engage within openings provided in the hub portion of the drum B. The drum B is provided with a chain winding portion 49 and a guide flange 50 projecting from said winding portion. The flange 50 is thickened, as indicated at 51, said thickened portion being slotted to accommodate the inner end link of the brake chain. The brake chain, which is indicated by 52, is anchored to the drum by means of a pin 53 extending through the end link of the chain and the wall portions of the slotted section of the flange 50 of the drum.

The worm wheel E has a hollow hublike section 54 at the left hand end thereof, as viewed in Figure 1, said hub section being rotatably journaled in the bearing opening 43 of the housing section 21. At the opposite side, the worm wheel E is provided with a cylindrical bearing flange 55, which is journaled in the bearing opening 38 of the wall 26 of the housing section 20. The spur gear D, which is hollow, as clearly shown in Figure 1, has a substantially cylindrical bearing portion 56, which is journaled within the worm wheel E. The tooth portion of the spur gear D has the opening thereof reduced in diameter, said opening receiving the bearing section 46 of the caplike portion 40 of the housing section 20.

The worm F, which meshes with the worm wheel E, is disposed above the same and has bearing portions 57—57, which are journaled in the bearing openings 47—47 of the housing section 21. The bearing portion 57, at the right hand end of the worm F, as seen in Figure 2, projects outwardly beyond the housing and has the usual hand wheel 58 fixed thereto. A thrust washer 59 is preferably interposed between the threaded portion of the worm wheel E and the wall section 31 at the right hand side of the section 21 of the housing, as viewed in Figure 2.

The clutch G and the operating lever H therefor are of well-known design and are illustrated and described in detail in Patent No. 1,974,581, Olander, September 25, 1934. The clutch member G briefly comprises a stem 60 which is slidable within the hollow hub portion of the worm wheel E and has a clutch head 61 at the right hand end thereof, which has clutch projections engageable with clutch projections on the interior of the spur gear D. The clutch actuating lever H is pivoted to the housing, as indicated at 62, and engages the clutch member G to shift the same inwardly and outwardly with respect to the worm wheel E and the spur gear D to either disengage the clutch head from the spur gear D or reengage the same therewith. The clutch spring K, which yieldingly opposes inward movement of the clutch member G, bears on the inner side of the head 61 of the clutch member and has its opposite end seated in the hollow boss 41 of the caplike portion 40 of the housing wall 26.

The operation of my improved hand brake mechanism in tightening the brakes is as follows: The hand wheel 58 is rotated in a right hand or clockwise direction, as viewed in Figure 1, thereby rotating the worm F and the worm wheel E. At this time, the clutch member G is operatively engaged with the spur gear D, thereby causing the latter to rotate with the worm wheel. The spur gear C and the drum B are driven by the spur gear D, thereby effecting winding of the chain on the drum. In easing off the brakes, the hand wheel 58 is rotated in a direction reverse to that hereinbefore described, thereby rotating the chain winding drum to unwind the chain therefrom. To effect quick release of the brakes, the clutch member G is disengaged from the spur gear D by operation of the lever H, thus disconnecting the spur gear D from the worm wheel E and permitting free rotation of the spur gears C and D and the connected chain winding drum B. Upon rotation of the hand wheel 58 in brake tightening direction, after the clutch has been disengaged, the latter will be automatically reengaged with the spur gear D through the action of gravity on the operating handle lever H and the action of the clutch spring K. If desired, the brakeman may manually manipulate the lever H to reengage the clutch with the spur gear D to operatively connect the driving mechanism with the chain winding drum. Rotation of the drum in chain unwinding direction will be arrested, when the brakes have been completely released, by engagement of the inner end link of the chain 52 with the projecting boss 41 on the caplike portion 40 of the wall 26 of the housing A.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain winding drum; of a spur gear fixed to said drum; a rotatable worm wheel; a second spur gear journaled in said worm wheel and meshing with said first named gear; a sliding clutch member within the worm wheel and rotatable therewith, said sliding clutch member having a clutch head extending into the second named spur gear, said clutch head and second named spur gear having interengaging cooperating clutch projections thereon; manually actuated means for sliding said clutch; a rotary worm member meshing with the worm wheel for rotating the latter; and a housing for said mechanism comprising two separate sections, each section forming a chamber, one of said sections enclosing the first named spur gear and chain winding drum, and the other section housing said worm, worm wheel, and clutch mechanism, said housing including a vertical dividing wall separating said chambers, said dividing wall being integral with one of said sections, and the other section being detachably secured to said wall.

2. In a hand brake mechanism, the combination with a two part housing comprising separable sections secured to the end wall of a railway car, one of said housing sections having a vertical wall integral therewith to which the other housing section is secured, said vertical wall closing said last named section and forming a side wall thereof; of a supporting shaft mounted in one part of said housing; a chain winding drum rotatably mounted on said shaft; a spur gear rotatably mounted on said shaft and fixed to the drum; a worm rotatably supported in bearing means in the other part of said housing; a hand wheel for rotating said worm; a second spur gear rotatably supported in bearing means on one of the walls of said first named part of the housing, said second named gear meshing with the first named gear; a worm wheel meshing with said worm, said worm wheel being coaxial with said second named gear and being rotatably journaled in bearing means on said first and second named parts of the housing; a clutch member axially slidable in said worm wheel and having a clutch head thereon engageable with said second named gear; and a lever for actuating said clutch member.

3. In a hand brake mechanism, the combination with a housing; of a rotary chain winding drum within the housing; a chain anchored to the drum; a spur gear fixed to the drum; a second spur gear meshing with said first named gear; an interior bearing projection on the housing providing bearing means for said second named gear, said projection being engageable by the chain to limit rotation of the drum in unwinding direction; a worm wheel coaxial with said second named gear; a worm meshing with said worm wheel; sliding clutch means operatively connecting the worm wheel and second named gear; means for rotating the worm; and means for actuating said clutch means.

4. In a hand brake mechanism, the combination with a housing; of a rotary chain winding drum within the housing; a chain anchored to the drum; a spur gear rotatable with the drum; a second spur gear meshing with said first named gear; cooperating worm and worm wheel members for actuating said second named spur gear; a sliding clutch operatively connecting said worm wheel and said second named gear; a spring yieldingly resisting movement of said clutch in one direction; and stop means on the housing engageable by the chain for limiting rotation of the drum in unwinding direction, said means being in the form of a hollow boss on one of the walls of the housing, said boss also forming a spring seat for one end of said spring.

5. In a hand brake mechanism, the combination with a housing comprising a section open at the bottom, a second section disposed at one side of said first named section, said housing being divided into two compartments by a separating wall formed integral with said first named section and to which said second named section is secured, said first named section having a wall spaced from said separating wall, said spaced wall and separating wall forming spaced side walls of said first named section, said second named section having a wall spaced from said separating wall, said last named spaced wall and separating wall forming spaced side walls of said second named section; of a winding drum and spur gear disposed within said first named section, said gear being fixed to the drum; a supporting shaft on which said gear and drum are rotatably mounted, said shaft being supported in the opposed side walls of said section; a second spur gear meshing with said first named spur gear, said spur gear being rotatably supported by said separating wall; driving gearing within said second named chamber including a manually actuated worm and a cooperating worm wheel; and clutch means operatively connecting said worm gear and second spur gear.

HARVEY J. LOUNSBURY.